United States Patent

O'Connor

[15] 3,690,528

[45] Sept. 12, 1972

[54] WATCHCLOCK TAPE STORAGE UNIT

[72] Inventor: Richard J. O'Connor, Paxton, Mass.

[73] Assignee: Pinkerton's Incorporated, New York, N.Y.

[22] Filed: Nov. 20, 1970

[21] Appl. No.: 91,483

[52] U.S. Cl. ........................225/37, 225/77, 225/84, 242/55, 242/55.3

[51] Int. Cl. ............................................B26f 3/02

[58] Field of Search.....242/67.1, 67.3, 55, 197, 67.2, 242/55.3, 58, 75.2, 68, 68.4, 118.41, 56.9; 225/34, 35, 36, 37, 38, 84, 85, 86, 87

[56] References Cited

UNITED STATES PATENTS 2,020,243 11/1935 Hathaway.............242/118.41

2,352,445 6/1944 Pinckney.................225/34 X

*Primary Examiner*—George F. Mautz
*Assistant Examiner*—Gregory A. Walters
*Attorney*—Chittick, Pfund, Birch, Samuels & Gauthier

[57] ABSTRACT

An apparatus for storing marked watchclock tapes for subsequent inspection and verification. The marked tapes are spooled onto a watchclock tape storage reel that is removably and rotatably held in the storage apparatus. The free end of the spooled watchclock tape is frictionally held to prevent inadvertant unwinding of the tape. A roll of pressure sensitive, adhesively coated tape is removably and rotatably held in the storage unit in side-by-side relationship with the watchclock tape storage reel. A serrated edged surface is provided for storage of the free end of the adhesively coated tape.

9 Claims, 3 Drawing Figures

INVENTOR.
RICHARD J. O'CONNOR
BY
Chittick, Pfund, Birch, Samuels & Gauthier

WATCHCLOCK TAPE STORAGE UNIT

BACKGROUND OF THE INVENTION

This invention relates to storage units in general and, more particularly, to a storage unit for watchclock tapes.

Watchclock tapes are used in the security field to provide a visual and, if desired, permanent record of the travels of a watchman around a predetermined security route. At each watchclock station, the watchman inserts a special key into the watchclock which causes the watchclock to print on a spooled tape, a suitable code indicating the watchclock station and the time that the watchclock was activated. At the end of the security tour or tours, the marked watchclock tape is removed from the watchclock and retained for subsequent inspection. At the present time, the bulky and relatively frangible paper watchclock tape is cut into strips and pasted in a book. This procedure is not only awkward and time consuming, but it also increases the risk of misplacing a portion of the marked watchclock tape.

It is accordingly a general object of the present invention to provide a watchclock tape storage unit which affords a quick and convenient method for storing marked watchclock tapes while at the same time making them readily accessible for subsequent inspection.

It is a specific object of the present invention to provide a watchclock tape storage unit which stores the marked tapes on a reel in spooled form.

It is another object of the invention to provide a watchclock tape storage unit which has means for mounting a roll of pressure sensitive, adhesively coated cellophane tape in side-by-side relation with the spooled watchclock tape.

It is a feature of the invention that means are provided for holding the free end of the marked watchclock tape to prevent the tape from unreeling in its stored condition.

It is still another feature of the invention to provide a serrated edged storage surface for the free end of the cellophane tape.

These objects and features and other objects and features of the present invention will best be understood from a detailed description of a preferred embodiment thereof, selected for purposes of illustration and shown in the accompanying drawings in which.

Figures 1, 3:
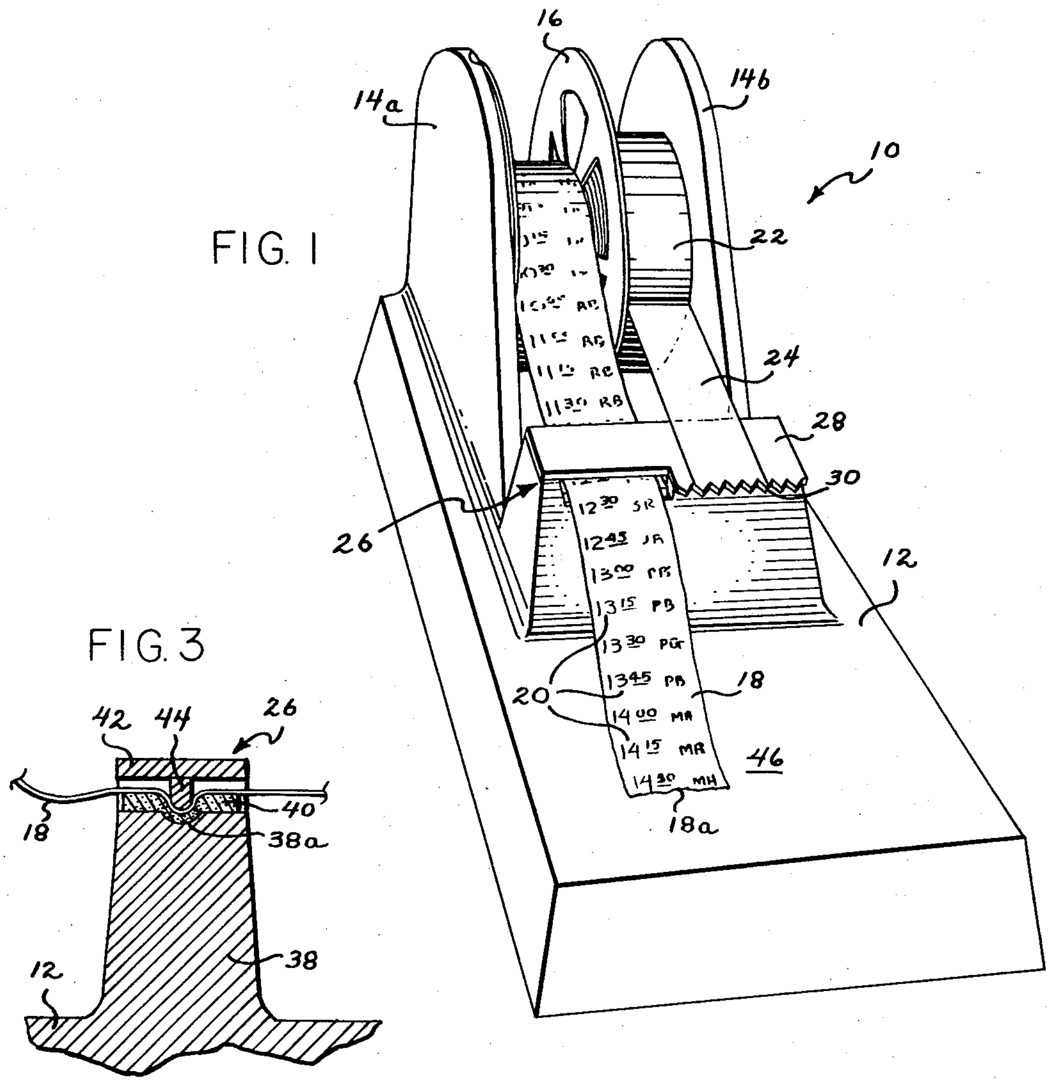
FIG. 1 is a perspective view of a watchclock tape storage unit constructed in accordance with the present invention and containing in spooled form a marked watchclock tape and a roll of pressure sensitive, adhesively coated cellophane tape.

Turning now to the drawings, and particularly to FIG. 1 thereof, there is shown in perspective view a watchclock tape storage unit constructed in accordance with the present invention and indicated generally by the reference numeral 10. The watchclock tape storage unit has a generally horizontal base member 12 and two upstanding, laterally spaced support members 14*a* and 14*b*. Preferably, the upstanding support members or side pieces 14*a* and 14*b* are integrally formed with the horizontal base member 12 as a single molded unit. It will be appreciated that while a variety of materials can be used to construct the watchclock tape storage unit 10, the structure of the tape storage unit lends itself to conventional plastic molding techniques. Therefore, it is recommended that the storage unit 10 be molded out of anyone of the currently available plastics, such as styrene, polypropylene or ABS.

A watchclock tape storage reel 16 is removable and rotatably mounted between the side pieces 14*a* and 14*b* with the axis of the reel parallel to the horizontal plane of the base member 12. The watchclock tape storage reel 16 is used to store a marked watchclock tape 18 that has been removed from a conventional watchclock. The watchclock tape 18 contains a plurality of indicia 20 which represents identifying information with respect to each watchclock station. As shown in FIG. 1, the marked watchclock tape 18 contains time information in 24 hour form and code numerals and/or letters for each watchclock station. Thus, for example, it can be seen from the marked watchclock tape 18 that the security guard was at station "PB" at 13:45, at station "MR" at 14:15 and so on.

The marked watchclock tape 18 is spooled onto the watchclock tape reel 16 for storage. Subsequent marked watchclock tapes are also spooled onto the watchclock tape reel 16 by securing the new tape to the free or distal end 18*a* of the previously spooled watchclock tape 18. The new tape can be fastened to the previously spooled watchclock tape by a variety of means, but preferably, transparent, pressure sensitive adhesively coated cellophane tape is used. For convenience and ease of operation, roll 22 of transparent cellophane tape 24 is removably and rotatably mounted in the watchclock tape storage unit 10 in side-by-side relationship with the watchclock tape reel 16.

In order to prevent the unraveling of both the previously spooled watchclock tape 18 and the cellophane tape 24, suitable means are included in the storage unit 10 for holding both tapes. Looking at FIGS. 1 through 3, a frictional holding system or tape "keeper" indicated generally by the reference numeral 26, is provided for the paper watchclock tape 18. The adhesively coated cellophane tape 24 is releasably secured to a horizontal tape storage surface 28. The leading edge of the cellophane tape storage surface 28 has a plurality of serrations 30 to facilitate cutting the cellophane tape.

Figure 2:
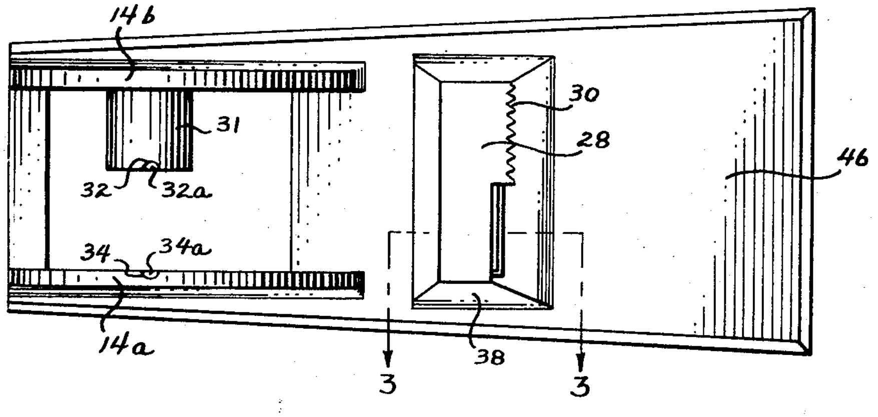
FIG. 2 is a plan view of the watchclock tape storage unit shown in FIG. 1 with the watchclock tape storage reel and cellophane tape roll removed; and, FIG. 3 is a view in cross-section taken along line 3—3 in FIG. 2 showing the structure for frictionally holding the free end of the spooled watchclock tape.

The mounting systems for the watchclock tape reel 16 and cellophane roll 22 are best seen in FIG. 2. The roll of cellophane tape is rotatably and removably mounted on a cylindrical member 31 which is affixed to the inboard side of one of the vertical upstanding support members 14*b*. The diameter of the cylindrical member 31 is slightly less than the diameter of the central opening of the roll of cellophane tape 22 so that the roll is free to rotate about the cylindrical member. The distal end of the cylinder 31 has a vertical groove 32 which terminates in an axle supporting shoulder 32*a*. The other upstanding side support member 14*a* has a corresponding vertically extending groove 34 on its inboard face. Groove 34 also terminates in an axle supporting shoulder 34*a*. The two grooves 32 and 34 and their corresponding shoulders **32*a* and 34*a* are laterally aligned with the shoulders 32*a* and 34*a* being in the same horizontal plane. This structural arrangement allows the watchclock tape storage reel 16** to be dropped down between the two upstanding side members -*a* and **14*b* until the storage reel axle (not shown) seats itself against the two axle supporting shoulders 32*a* and 34*a*. While this particular arrangement is preferred it will, of course, be appreciated that other mounting systems can be used to provide the desired rotatable and removable mounting of the watchclock tape storage reel 16 and cellophane tape roll 22**.

The frictional holding system for the spooled watchclock tape 18 which is indicated generally by the reference numeral 26 in FIGS. 1 and 3 is best seen in the cross-sectional view of FIG. 3. The frictional holding system 26 comprises an upstanding support member 38 which has a groove **38*a* extending transversely across the support member for a distance slightly greater than the width of the watchclock tape 18. A layer of compressible material, such as foam rubber 40, is mounted on the top of the support member 38 and covers groove 38*a*. A cover piece 42 having a downwardly extending member 44 is secured to the support member 38 in superposed relation with respect to the layer of foam rubber 40. In the operative position, the downwardly extending member 44 compresses the foam rubber layer 40 in the vicinity of the groove 38 thereby forming a semi-circular path for the watchclock tape 18. As shown in FIG. 3, the tape 18 is frictionally held between the distal end of the downwardly depending member 44 and the compressed portion of the foam rubber layer 40 overlying groove 38**.

Having described the structural components of the watchclock tape storage unit 10, I will now describe the operation of the unit for conveniently and easily storing watchclock tapes for subsequent inspection. Assuming that the watchclock tape storage reel 16 is empty and that a roll of cellophane tape 22 has been placed over the cylindrical member 31 and the free end of the cellophane tape releasably secured to the surface 28, the watchclock tape storage unit 10 is now ready for storing marked watchclock tapes. The first marked tape is inserted through the frictional holding means 26 and secured to the hub of the tape storage reel 16 by means of a small piece of the adhesively coated cellophane tape 24. The take-up storage reel 16 is then rotated in a backwardly direction, as viewed in FIG. 1, to spool the watchclock tape 18 onto the take-up reel 16. The marked watchclock tape is manually wound onto the tape storage reel 16 until a small section of the tape remains in front of the tape frictional holding means 26, as illustrated in FIG. 1. The distal or free end of the marked watchclock tape **18*a* is left unwound to permit subsequent attachment of the next marked watchclock tape. Normally at this time, the tape is initialed and dated by the security supervisor near the distal end 18*a***.

When the next marked watchclock tape is ready for storage in the tape storage unit 16, a small piece of the cellophane tape 24 is removed from the roll 22. Serrated edges 30 provide a convenient means for separating or cutting the necessary length of cellophane tape. The second watchclock tape is aligned with and placed over the distal end of the previously spooled tape with a slight overlap. The two watchclock tapes are then joined together by means of the previously cut piece of adhesively coated cellophane tape 24. A flat forwardly extending surface 46 on the base member 12 provides a convenient working area. When the tape reel 16 is full, it is simply slid out from between the two upstanding side pieces **14*a* and 14*b* and another empty spool 16** is put in its place.

Having described in detail the preferred embodiment of my invention, what I claim and desire to secure by Letters Patent of the United States is:

1. An apparatus for storing watchclock tapes comprising:

a base member having first and second laterally spaced, upstanding support members;

means on said first support member for removably and rotatably holding a roll of pressure sensitive, adhesively coated tape;

means on said adhesive tape roll holding means and means on said second upstanding support member for removably and rotatably holding a watchclock tape storage reel; and, means mounted on said base member for frictionally holding the free end of a watchclock tape spooled on said watchclock tape storage reel during storage of said watchclock tape.

2. The apparatus of claim 1 wherein said means for frictionally holding the free end of the stored, watchclock tape comprises:

a support member mounted on said base;

a layer of a compressible material positioned on said support member and having a width at least substantially equal to the width of the watchclock tape; and, means for compressing said material across the width thereof so that said watchclock tape is held between the compressed portion of the material and said compressing means.

3. An apparatus for storing watchclock tapes comprising:

a base member having first and second laterally spaced, upstanding support members;

a generally cylindrical roll supporting element for supporting a roll of adhesively coated tape, said roll supporting element being mounted on the inboard side of said first upstanding support member with the longitudinal axis of the cylindrical roll supporting element being in a horizontal position, said roll supporting element having a diameter slightly less than the inside diameter of the roll of adhesively coated tape; and a downwardly extending axle receiving groove on the distal end thereof, said groove terminating at the lower end in an axle supporting shoulder; and, a corresponding laterally aligned axle receiving groove on the inboard side of said second upstanding support member, said groove terminating in an axle supporting shoulder that is horizontally aligned with the axle supporting shoulder in said cylindrical roll supporting element so that a watchclock tape storage reel axle can be removably and rotatably mounted with the reel axle seated against said axle supporting shoulders.

4. The apparatus of claim 3 further characterized by means on said base member for frictionally holding the free end of a spooled watchclock tape when a watchclock tape storage reel containing said spooled tape is rotatably mounted with the reel axle seated against the axle supporting shoulders.

5. The apparatus of claim 4 further characterized by means on said base member for releasably securing the free end of a roll of adhesively coated tape when the roll is rotatably supported by said roll supporting element, said securing means including a serrated edge for cutting said adhesive tape.

6. The apparatus of claim 4 wherein said means for frictionally holding the free end of the stored, watchclock tape comprises:

a support member mounted on said base;

a layer of a compressible material positioned on said support member and having a width at least substantially equal to the width of the watchclock tape; and, means for compressing said material across the width thereof so that said watchclock tape is held between the compressed portion of the material and said compressing means.

7. An apparatus for storing watchclock tapes comprising:

a base member having first and second laterally spaced, upstanding support members;

a generally cylindrical roll supporting element for supporting a roll of adhesively coated tape, said roll support element being mounted on the inboard side of said first upstanding support member with the longitudinal axis of the cylindrical roll supporting element being in a horizontal position, said supporting element having a diameter slightly less than the inside diameter of the roll of adhesively coated tape;

means on said adhesively coated tape roll supporting element and means on said second upstanding support member for removably and rotatably holding a watchclock tape storage reel; and, means on said base member for frictionally holding the free end of a spooled watchclock tape when a watchclock tape storage reel containing said spooled tape is rotatably held by said storage reel holding means.

8. The apparatus of claim 7 further characterized by means on said base member for releasably securing the free end of a roll of adhesively coated tape when the roll is rotatably supported by said roll supporting element, said securing means including a serrated edge for cutting said adhesive tape.

9. The appratus of claim 7 wherein said means for frictionally holding the free end of the stored, watchclock tape comprises:

a support member mounted on said base;

a layer of a compressible material positioned on said support member and having a width at least substantially equal to the width of the watchclock tape; and, means for compressing said material across the width thereof so that said watchclock tape is held between the compressed portion of the material and said compressing means.

* * * * *